Sept. 7, 1965　　　　M. L. PANZER ETAL　　　　3,204,521
FILM READER

Filed Sept. 5, 1961　　　　　　　　　　　2 Sheets-Sheet 1

MAX L. PANZER
ALLAN M. HUDSON
GLYNN H. LOCKWOOD
SHELDON CYR CRANE
　　　INVENTORS

BY *Lothrop & West*

ATTORNEYS

Sept. 7, 1965 M. L. PANZER ETAL 3,204,521
FILM READER
Filed Sept. 5, 1961 2 Sheets-Sheet 2

Max L. Panzer
Allan M. Hudson
Glynn H. Lockwood
Sheldon Cyr Crane
INVENTORS

BY Lothrop r West

ATTORNEYS 3,204,521
FILM READER
Max L. Panzer, Pebble Beach, Allan M. Hudson and Glynn H. Lockwood, Carmel, and Sheldon Cyr Crane, Monterey, Calif., assignors to Del Monte Technical Associates, Monterey, Calif., a partnership
Filed Sept. 5, 1961, Ser. No. 135,841
7 Claims. (Cl. 88—24)

Our invention relates particularly to devices for use with a transparency such as photographic plate or film and capable of highly accurate location of points or minute areas on the transparency. A device for holding and positioning a film with extreme accuracy and usable in connection with this film reader is disclosed in our co-pending application entitled "Measuring Engine" filed July 13, 1961, with Serial No. 123,897.

In certain scientific and technical activities it is of interest to observe a point or localized area of minute size occurring on a photographic film or plate and to display and record the occurrence of such a point or minute area with respect to a coordinate system or with respect to another similar point or both. The mechanism for locating the transparency whether film or plate has been made to a mechanical accuracy on the order of a micron and it is desired to produce for use with such engine an optical reading device capable of projecting for display and for recording the photographic point or area images of the transparency in a manner having comparable precision.

It is desired to utilize a beam of light from an effective source for this purpose, but light sources readily available and otherwise suitable also produce a great deal of heat. The resulting temperature changes are disturbing to the measuring engine portion of the mechanism as well as to the transparency involved. For the purpose of providing a coordinate system and to preserve substantial accuracy it is desired also to afford a reticle the image of which can be projected onto the display screen along with the projection of the point or minute area being momentarily considered but it is desired not to record the reticle image.

It is therefore an object of the invention to provide a film reader effective by optical means to afford a display and a record of a transparency being examined.

Another object of the invention is to provide such a film reader in which heat from the light source produces no deleterious effects.

Another object of the invention is to provide a film reader in which the reticle image although effective upon the display screen is isolated from the recording mechanism.

Another object of the invention is to provide a film reader for reading transparencies with a high degree of accuracy.

Another object of the invention is in general to provide an improved film reader.

Other objects together with the foregoing are attained in the embodiment of the invention described in the accompanying description and illustrated in the accompanying drawings in which.

Figure 1:
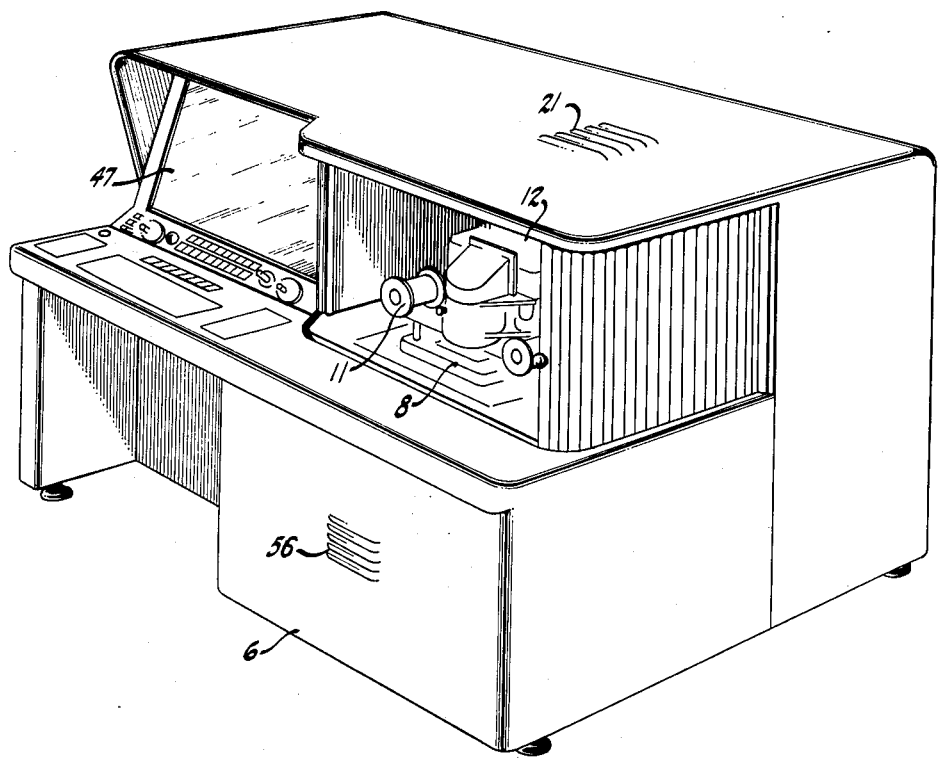
FIGURE 1 is a perspective view of a film reader constructed in accordance with the invention and showing the general relationship of the externally visible parts.
Figure 2:
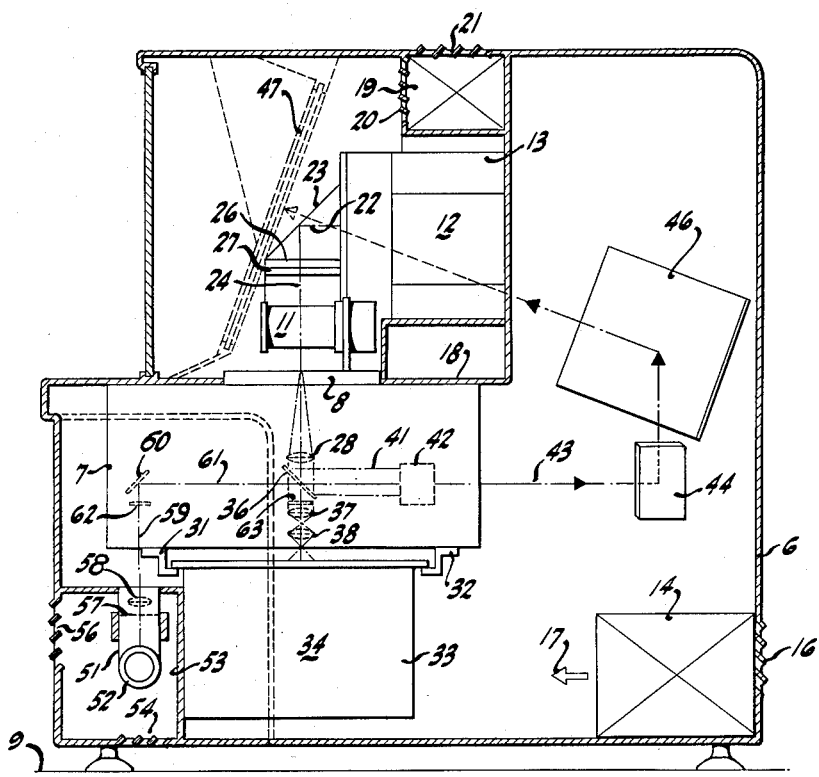
FIGURE 2 is a cross section on a vertical longitudinal plane showing the interior arrangement of the device.

While the film reader has been successfully incorporated in a number of variant forms, it is preferred to embody it especially as shown herein. In this form the mechanism is all enclosed in a frame 6 in the form of a cabinet having appropriate structural members and panels to constitute a support and an enclosure. The cabinet or frame 6 on one side houses a sub-frame 7 including a measuring engine of the sort disclosed in our above-identified copending application. The measuring engine is not shown herein in detail but includes a means 8 for supporting a transparency in a generally horizontal plane at the desired elevation or distance from a reference such as the floor 9. The supporting means 8 includes as part of the measuring engine a carriage movable entirely in a horizontal plane for shifting the transparency both in a fore and aft direction and in a transverse direction. In addition, the supporting means usually includes a device for rotating the transparency within the horizontal plane.

The transparency can be of any sort and customarily is a photographic image on a glass plate or is a flat film or somtimes is a roll film. An adapter 11 is provided in the case of roll film and in any case appropriate holders (not shown) are employed in connection with the supporting means 8 for disposing the transparency in the desired plane and in the desired location with respect to the frame 6.

In order to transmit a beam of light through the transparency on the support 8 there is provided within the frame 6 a source of light 12. The reference to a light source is used generally to designate a separate lamp house 13 equipped with a light element (not shown). This often is an electrically energized mercury tube. Since the light source is exothermic and converts a good deal of the energizing electrical current into heat, especial means are provided to ameliorate the deleterious effects of the heat.

In the first instance, within the frame housing 6 there is provided an air circulation device 14 which takes atmospheric air in through louvers 16 and dsicharges it in the general direction of the arrow 17 so that the interior of the cabinet frame 6 is cooled and partially pressurized. Some of the circulating air is carried through a duct 18 into the lamp house 13 and is then appropriately discharged to the atmosphere.

In addition, the light element especially if it includes a mercury device is provided with a separate transparent housing communicating with a heat exchanger 19 entirely isolated internally from air circulating within the interior of the frame 6. The heat exchanger effects heat transfer to such portion of the circulating air which flows over the exterior of the heat exchanger after entering through louvers 20 and then discharging to the atmosphere through louvers 21.

The reason for this heat exchanger and the atmospheric isolation of the light element is in the event of breakage. Any poisonous mercury vapor released by breakage is confined to the closed and isolated heat exchanger interior circuit and cannot get into the interior of the cabinet frame 6 or into the atmosphere.

Various sorts of heat emanate from the light source 12 consequently, the lamp house 13 is located above the level of the supporting means 8 and thus advantage is taken of the tendency of the convection heat to rise and so to flow in a direction away from the lower supporting means 8.

From the source of light in the lamp house 13 a beam of light, represented by the line 22, extends in a generally horizontal direction. This beam is comprised primarily of visible light but also includes some invisible light or radant energy in the infrared range. This radiant heat is considered to be deleterious. Hence the beam 22 is impinged upon a first beamsplitting mirror 23. This is a mirror having the property of passing substantally all of the radiant energy at invisible frequencies and of reflecting substantially all of the radiant energy at visible frequencies and is disposed in the beam 22 at an appropriate angle to reflect substantially only the visible light into a downwardly extending vertical path.

Most of the infrared radiation is not deflected by the beamsplitting mirror 23 but passes directly through it to be absorbed in the indifferent surroundings. The vertically extending beam, although almost entirely visible light, still contains some scattered infrared radiation and so is passed through a substantially horizontally arranged second beamsplitting mirror 26. This has the property of passing the visible light and of reflecting backwardly or upwardly the remaining stray infrared radiation.

As a further precaution against the transmission of heat toward the transparency a liquid cell 27 is mounted on the frame 6 between the second beamsplitting mirror 26 and the supporting means 8. This is a sandwich of generally horizontal transparent plates between which a transparent heat carrying liquid such as ethylene glycol is circulated. Thus the visible light emerging below the cell 27 is substantially free of any radiation in the heat range. The further descending relatively cold light beam 24 then passes into and through the transparency on the supporting means 8.

Upon emerging from the transparency the light beam 24 is characterized by the nature of the photographic image at the particular point or minute area it has traversed in the transparency. The light beam passes downwardly in its characterized condition through a first transfer lens 28 having the effect of substantially collimating the light rays.

Two things are done with the now characterized light rays. The first is to afford an immediate visual display for the operator. The second is to affect a light responsive device utilized, for example, to actuate a computer or comparable device.

On the frame 6 and preferably supported by guides 31 and 32 is a removable casing 33 containing the light responsive or light receiving structure for actuating the computer or comparable device. The mechanism within the casing 33 is not now of detailed consequence. It is sufficient to indicate that this mechanism is normally positioned vertically below the first transfer lens 28. So that some part of the light from such lens 28 will be effective upon the receiving and responsive means 34 a main beamsplitting mirror 36 is appropriately mounted on the frame 6 between the transparency 8 and the housing 33 just below the first transfer lens 28. The mirror 36 permits the passage of some of the visible light downwardly through lens devices 37 and 38 to provide appropriate transmission to the receiving and responsive means 34.

The main beamsplitting mirror 36 also has the function of deflecting a portion of the downwardly extending light beam into a horizontal path 41. The so deflected horizontally traveling light beam 41 traverses a second transfer lens 42 and then travels in the direction of the path 43. It is reflected by an initial reflecting mirror 44 in the frame 6 and then is reflected by a final reflecting mirror 46 on the frame 6 to impinge upon a display screen 47. This is mounted on the front of the frame 6 where it is readily visible to the operator. The mirrors 44 and 46 are so placed and angled that the beam 43 is transferred in a lateral direction from one side of the frame 6 to the other side. In this fashion there is afforded an enlarged display of the material appearing in the point or area undergoing examination on the transparency.

The observer or user of the machine is required under some conditions to control traversing movements of the measuring engine so as to displace the transparency on the supporting means 8. Some sort of reference pattern or grid is desirable for this purpose. An optical projection of a rectangular coordinate grid is consequently provided on the display screen 47 in superposition of the instantaneous display of the scanned portion of the transparency. For this reason, at a convenient location on the frame 6 there is provided a reticle holder 51. The holder includes a second light source 52. As this also is exothermic, the reticle holder and light source are thermally isolated within an enclosure 53. Inlet and outlet louvers 54 and 56 provide for an individual circulation of atmospheric air so as to preclude the transmission of substantial heat to the remaining part of the structure.

Within the reticle holder 51 and in position so that light from the source 52 can be directed therethrough is a reticle 57 of any convenient pattern usually of rectangular coordinates. The light passing through the recticle 57 from the source 52 traverses a lens 58 and emerges in a vertical beam 59. A reflecting mirror 60 within the frame 6 transfers the vertical beam 59 to a horizontal course 61 coaxial with that of the beam 41. The light in the beam 61 passes for the most part through the main beamsplitting mirror 36 and conjoins with the light in the beam 41 to travel in the path 43 and to be coincidently displayed upon the display screen 47 with the characterized beam from the transparency.

The main beamsplitting mirror 36 has the property of reflecting a portion of the reticle beam 61 through the lens systems 37 and 38 into the receiving and responsive mechanism 34 but the reticle pattern is not desired in the mechanism 34. For this reason there is disposed in the vertical beam 59 between the reticle 57 and the mirror 60 a polarizing screen or filter 62 effective to polarize the reticle beam prior to its impingement upon the mirror 60. In addition, in the light path between the main beamsplitting mirror 36 and the sensing structure 34 and preferably between the main beamsplitting mirror 36 and the uppermost lens system 37 there is disposed another polarizing filter 63 or screen. The effect is to block any polarized light which instead of passing through the main beamsplitting mirror 36 in a horizontal direction is reflected downwardly.

Pursuant to the invention, therefore, there has been provided a film reader effective to project a light beam from an exothermic light source through a movable transparency without deleterious thermal effects and to treat the characterized light passed through the transparency in two ways. Some of the light affords a visual display to the user of the device and some of the light affects a receiving and responsive structure appropriate for the actuation of a computer, for example. Additionally, the mechanism includes a reticle projected concurrently onto the display screen for concurrent inspection with the film image thereon but the reticle is ineffective upon the receiving and responsive mechanism. The effects of heat upon the highly accurate measuring engine are substantially eliminated to the extent that the general thermal stability of the structure is such that accuracy of the measuring engine, of the order of one micron, is maintained throughout the optical system of the device,

What is claimed is:

1. A film reader for use with transparencies comprising a frame, means on said frame for supporting a transparency at a given elevation, and exothermic light source on said frame above said supporting means, means for carrying heat from said source upwardly away from said supporting means, means for reflecting visible light from said source downwardly toward said supporting means while passing invisible light from said source away from said supporting means, means for reflecting downwardly travelling invisible light away from said supporting means, means on said frame below said supporting means for receiving some of the light transmitted through said transparency from said source, a display screen on said frame above said supporting means, and means on said frame for directing to said display screen some of the light transmitted through said transparency from said source toward receiving means.

2. A film reader for use with transparencies comprising a frame, means on said frame for supporting a transparency at a given elevation, a first light source on said frame above said supporting means, a display screen on said frame above said supporting means, a main beamsplitting mirror on said frame below said supporting means, means for transmitting light from said first source downwardly through said supporting means to said main beamsplitting mirror for partial reflection therefrom, a reticle, means for holding said reticle on said frame, a second light source on said frame, means for projecting light from second source through said reticle and through said main beamsplitting mirror, and means on said frame for directing light from said first source and reflected from said main beamsplitting mirror and light from said second source and transmitted through said main beamsplitting mirror to said display screen.

3. A film reader for use with transparencies comprising a frame, means on said frame for supporting a transparency in a horizontal plane, a main beamsplitting mirror on said frame below said supporting means, a display screen on said frame above said supporting means, a reticle, means for holding said reticle on said frame, means for directing light first through said reticle and then through said main beamsplitting mirror to said display screen, means for directing light downwardly first through said supporting means and then to said main beamsplitting mirror for partial reflection therefrom, and means for transmitting said light reflected from said main beamsplitting mirror to said display screen.

4. A film reader for use with transparencies comprising a frame, means on said frame for supporting a transparency in a horizontal plane, a main beamsplitting mirror on said frame below said supporting means, means on said frame for transmitting a first beam of light downwardly through said supporting means to said main beamsplitting mirror for reflection of a portion thereof, a reticle, means on said frame for holding said reticle, means for transmitting a second beam of light through said reticle and through said main beamsplitting mirror, a display screen on said frame above said supporting means, and means for transmitting the reflected portion of said first beam of light and said second beam of light from said main beamsplitting mirror to said display screen.

5. A film reader for use with transparencies comprising a frame, means on said frame for supporting a transparency in a horizontal plane, means on said frame for directing light downwardly through said supporting means, light receiving and responsive means on said frame below said supporting means for light passing through said supporting means, a display screen on said frame, a main beamsplitting mirror on said frame between said supporting means and said receiving and responsive means for deflecting some of said light passing through said supporting means toward said display screen, a reticle, means on said frame for holding said reticle, means for directing light through said reticle and toward said main beamsplitting mirror, means for polarizing said light between said reticle and said main beamsplitting mirror, and means between said main beamsplitting mirror and said receiving and responsive means for blocking said polarized light.

6. A film reader for use with a transparency comprising a frame, means on said frame for supporting a transparency, means on said frame for directing light through said transparency, light receiving and responsive means on said frame for light passing through said transparency, a display screen on said frame, a main beamsplitting mirror on said frame between said transparency and said receiving and responsive means for directing some of said light passing through said transparency to said display screen, a reticle, means for holding said reticle on said frame, means for directing light through said reticle to said main beamsplitting mirror, means for polarizing light passing through said reticle to said main beamsplitting mirror, and means between said main beamsplitting mirror and said receiving and responsive means for blocking said polarized light.

7. A film reader for use with transparencies comprising a frame, means on said frame for supporting a transparency in substantially a horizontal plane and at a given elevation, an exothermic light source mounted on said frame above said plane and adapted to provide a horizontal beam of light and heat, a first beamsplitting mirror on said frame in said beam and directly above said supporting means whereby light and some heat from said beam are directed downwardly and other heat from said beam is passed horizontally through said first mirror, a second beamsplitting mirror on said frame in said downwardly directed light and heat and disposed in a horizontal plane between said first beamsplitting mirror and said supporting means whereby said downwardly directed light is passed vertically downward through said second mirror and said downwardly directed heat is reflected vertically upward, light receiving and responsive means on said frame directly below said mounting means in the path of light passing downwardly through said mounting means, a main beamsplitting mirror on said frame and arranged at a forty-five degree angle between said mounting means and said light receiving and responsive means in the path of light passing downwardly through said mounting means to deflect some of said light in a horizontal path, a reticle holder on said frame, means for sending light through said reticle holder and through said main beamsplitting mirror in said horizontal path, a display screen on said frame to one side of and above said horizontal plane, and mirrors on said frame for reflecting light from said horizontal path to said display screen.

References Cited by the Examiner

UNITED STATES PATENTS

| | | | |
|---|---|---|---|
| 2,159,614 | 5/39 | Evans et al. | 88—24 |
| 2,262,534 | 11/41 | Hoch | 88—24 |
| 2,538,840 | 1/51 | Lowber et al. | 88—24 |
| 2,765,704 | 10/56 | Mottu | 88—24 |
| 2,852,980 | 9/58 | Schroder | 88—24 |

LEO SMILOW, *Primary Examiner.*

EMIL G. ANDERSON, *Examiner.*